D. BIRSTLER.
DUMPING WAGON.
APPLICATION FILED DEC. 30, 1918.

1,397,355.

Patented Nov. 15, 1921.
2 SHEETS—SHEET 1.

Inventor
Daniel Birstler
By his Attorney
Jas. H. Griffin

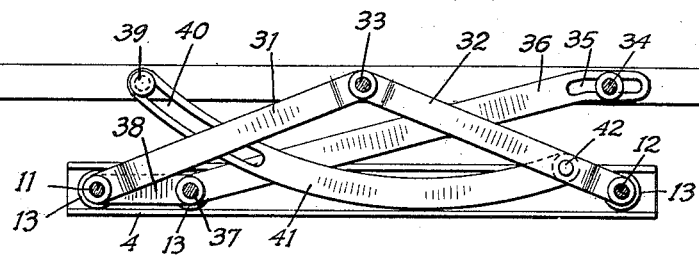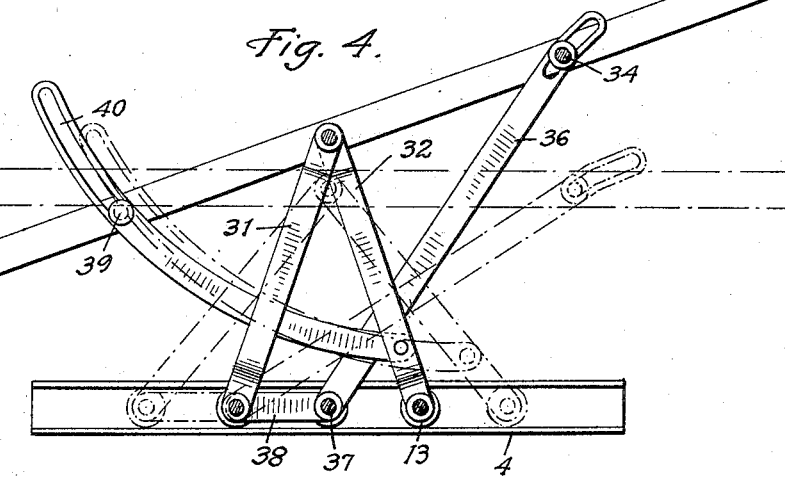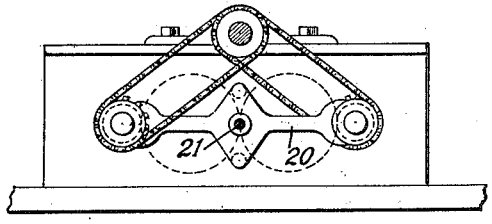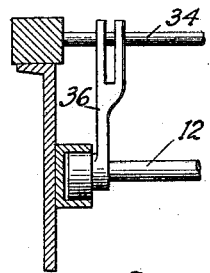

UNITED STATES PATENT OFFICE.

DANIEL BIRSTLER, OF WESTCHESTER, NEW YORK.

DUMPING-WAGON.

1,397,355.   Specification of Letters Patent.   Patented Nov. 15, 1921.

Application filed December 30, 1918. Serial No. 268,922.

*To all whom it may concern:*

Be it known that I, DANIEL BIRSTLER, a citizen of Austria, residing at Westchester, county of Bronx and State of New York, have invented a certain new and useful Improvement in Dumping-Wagons, of which the following is a specification.

The object of my invention is to provide a wagon of this class which may be used to dump material from the rear and which may be raised or lowered by power and which will be reliable in operation, easy to manufacture and durable in use.

Features of the invention other than those specified, will be apparent from the hereinafter detailed description, taken in conjunction with the accompanying drawings.

In the accompanying drawings, I have illustrated one practical form of the invention, but the construction shown therein is to be understood as illustrative only, and not as defining the limits of the invention.

Referring to the drawings, Figure 1 is a side elevation of an automobile truck provided with my improvement;

Fig. 3 is a side elevation of the body and link connections in the positions which they assume when the body is slightly elevated above the chassis;

Fig. 4 is a view similar to Fig. 3, but illustrating the parts in positions which they assume when the body is fully elevated and tilted;

Fig. 5 is a sectional view showing the power mechanism for driving the elevating gear; and Fig. 6 is a sectional view taken on line 6—6 of Fig. 2, looking in the direction of the arrows.

Throughout the various views of the drawings, similar reference characters designate similar parts.

Figure 1:
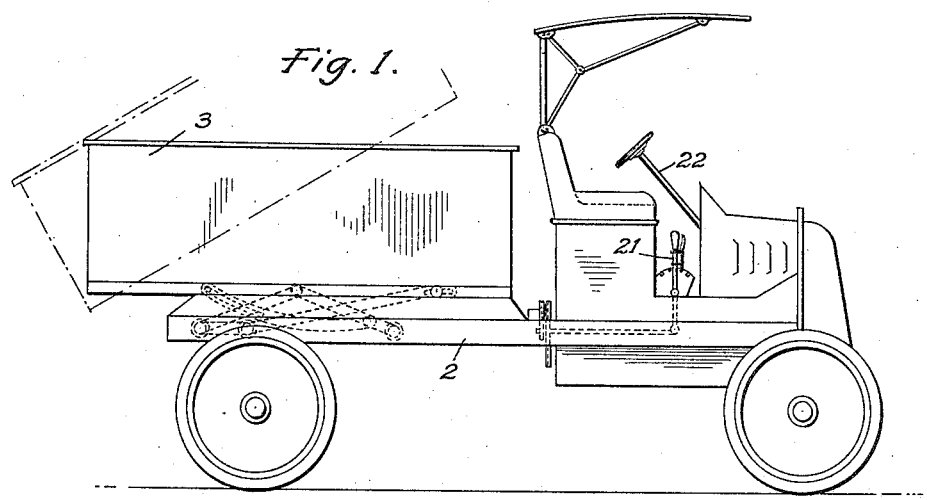
Figure 2:
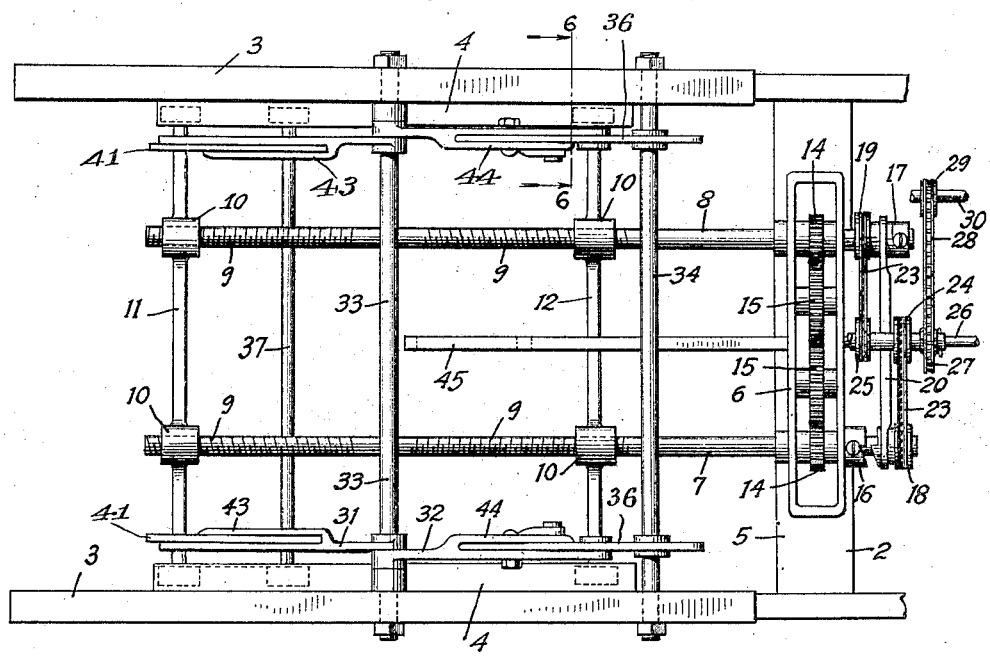
Fig. 2 is a plan view of a portion of the chassis with the body removed.

My improved elevating gear is mounted on the chassis 2 of a truck and supports a body 3. The chassis 2 is preferably provided with side sills of channel iron which may be designated generically by the character 4 and the side sills are united by a crossing 5 which carries a gear case 6 from which extend rearwardly two shafts 7 and 8 which are provided at their rear, with right and left threads 9 which engage corresponding nuts 10 which are preferably integral with their respective pivot bars 11 and 12 respectively, and these pivot bars are provided at their ends with rollers 13 which run in the channel bars 4 and are guided thereby, forming movable pivots for the link mechanism described below.

The front ends of the shafts 7 and 8 are provided with pinions 14 which mesh with corresponding idle spur gears 15 all of which are mounted in the gear case 6 and so arranged and disposed that the shafts 7 and 8 always turn together and always in the opposite direction.

Shafts 7 and 8 are also provided with clutches 16 and 17 which are adapted to throw their respective sprocket wheels 18 and 19 into engagement with their shafts or out of engagement with the same. These clutches are connected by a cross bar 20 so that one, but not both of these clutches, may be thrown into operative relation at one time, and the bar 20 is shifted by means of a link and lever connection 21, which runs to a position convenient for the driver of the car and near his steering gear 22 or to some other convenient location. The sprocket wheels 18 and 19 have suitable sprocket chains 23 which run to sprocket wheels 24 and 25 on a shaft 26 which is journaled in any suitable way, not shown, and this shaft 26 carries an additional sprocket wheel 27 which carries a chain 28, that runs to a sprocket wheel 29 on a shaft 30 which is connected to the transmission gear of the car, so that it may be run either clockwise or anti-clockwise, as desired. The clutch mechanism is such that when the clutch 17 is thrown in, and clutch 16 is thrown out, as shown, the device may be used for elevating the body 3, and if the clutch 17 is thrown out and the clutch 16 thrown in, the device may be used for lowering the body.

Mechanism for elevating the body will now be described. Shafts 11 and 12 are connected by diagonally disposed links 31 and 32 which run to a pivot 33, fixed in the body 3. This body also carries a forward pivot 34 on which slides a suitable slot 35 of a link 36 which runs to the shaft 37 provided with end rollers 13 engaging the track 4 and a short link 38 connects the shafts 11 and 37. It will be understood, without further explanation, that the link mechanism is duplicated on each side of the chassis so that a description of one side will answer for both, and the body pivots 39, 33 and 34 are fixed in the body 3 and extend across the same so as to engage both sets of links.

The body 3 also has a rear pivot 39 which enters a slot 40 in a curved link 41, which is pivoted at 42 to a position slightly above the shaft 12 and to the link 32, substantially as indicated. The links 31 and 32 are preferably bifurcated so as to provide guides 43 and 44 respectively, which tend to keep the links 41 and 36 running true.

The shaft 37 is moved forward by the links 38 until its middle engages a stop 45 which it reaches when the body 3 is elevated by its mechanism and properly inclined, as indicated.

In view of the foregoing, the operation of my improved support will be readily understood. Assuming the body to be in the position shown in Fig. 1, the clutch mechanism 17 is thrown in as indicated and the engine is started and the transmission is set for the forward drive of the shaft 30. Under these circumstances, the power of this shaft is transmitted to the shafts 7 and 8 so as to cause them to bring the nuts 10 together and thereby draw together the cross shafts 11 and 12 and bring the shaft 37 forward through the links 38, as above set forth. This crowding together of the pivots at the bottom of the links 31, 32, 36 and 41 causes them to elevate the body 3, first to the position shown in Fig. 3 where it is level and then to the position shown in Fig. 4, where it is inclined toward the rear and in position for dumping. During the major part of the lifting movement, the links 41 are idly pivoted on pivots 42 until the body 3 has risen a sufficient height for the pivots 34 to engage with the ends of slots 35, whereupon further upward movement of the body causes links 36 to exert a push on the pivots 34, with the result that the body is tilted into the full line position of Fig. 4, the ends of the slots 40 serving to limit the tilting angle of the body. After the wagon has been dumped the body 3 is lowered by throwing the clutch 17 out of engagement and the clutch 16 into engagement, and the body is lowered after which the clutch 17 is thrown back into engagement, so as to be ready for the next elevating operation.

Slight changes may be made in the structure described, such as the substitution of equivalents, without departing from the spirit or substance of the invention, the scope of which is commensurate with the appended claims.

Having thus fully described the invention, what I claim as new, and desire to secure by Letters Patent, is:

1. In a wagon of the class described, a chassis with tracks, a body with three pivots, two sets of movable pivots in said tracks and one set of movable pivots intermediate of the other two, links connecting the extreme pivots of the tracks with the center pivot of the body and links connecting the intermediate pivots of the tracks with the forward pivot of the body and additional links connecting the rear pivot of the body with the forward links.

2. In a device of the class described, a chassis provided with tracks, a body with three pivots, three sets of movable pivots in said tracks, links connecting the pivots of the body with the movable pivots and means for drawing together the movable pivots, whereby the body may be raised and then inclined.

3. In a device of the class described, a chassis and a body, a pair of toggle links pivoted to each side of the body and slidably associated with the chassis, means for moving the chassis ends of each pair of toggle links toward and away from one another to raise and lower the body relative to the chassis, means associated with one link of each pair and with the body for maintaining the body in horizontal position while the same is being raised to a predetermined elevation, and means associated with the other link of each pair and with the body for automatically tilting the body when it is raised above said predetermined elevation.

In testimony whereof, I have signed my name to this specification.

DANIEL BIRSTLER.